United States Patent
Iijima

[19]

[11] Patent Number: 6,141,068
[45] Date of Patent: Oct. 31, 2000

[54] DISPLAY DEVICES, ELECTRONIC APPARATUS USING THE SAME, AND POLARIZED LIGHT SEPARATOR

[75] Inventor: Chiyoaki Iijima, Ina, Japan

[73] Assignee: Seiko Epson Corporation, Japan

[21] Appl. No.: 09/242,346

[22] PCT Filed: May 27, 1998

[86] PCT No.: PCT/JP98/02350

§ 371 Date: Feb. 11, 1999

§ 102(e) Date: Feb. 11, 1999

[87] PCT Pub. No.: WO98/57220

PCT Pub. Date: Dec. 17, 1998

[30] Foreign Application Priority Data

Jun. 13, 1997 [JP] Japan .................................... 9-156718

[51] Int. Cl.⁷ .............................................. G02F 1/1335
[52] U.S. Cl. .............................................. 349/96; 349/98
[58] Field of Search ............................... 349/96, 98, 117, 349/113

[56] References Cited

U.S. PATENT DOCUMENTS

| | | | |
|---|---|---|---|
| 5,555,114 | 9/1996 | Narita et al. | 359/65 |
| 5,619,355 | 4/1997 | Sharp et al. | 349/98 |
| 5,627,666 | 5/1997 | Sharp et al. | 349/98 |
| 5,712,694 | 1/1998 | Taira et al. | 349/9 |
| 5,796,454 | 8/1998 | Ma | 349/98 |
| 5,825,444 | 10/1998 | Broer et al. | 349/98 |

FOREIGN PATENT DOCUMENTS

| | | |
|---|---|---|
| 3-83020 | 4/1991 | Japan . |
| 9-73105 | 3/1997 | Japan . |
| 9-146088 | 6/1997 | Japan . |
| 10-115828 | 5/1998 | Japan . |
| WO95/17303 | 6/1995 | WIPO . |
| WO95/17691 | 6/1995 | WIPO . |
| WO95/17692 | 6/1995 | WIPO . |
| WO95/17699 | 6/1995 | WIPO . |
| WO95/27919 | 10/1995 | WIPO . |
| WO96/19347 | 6/1996 | WIPO . |
| WO97/01439 | 1/1997 | WIPO . |
| WO97/01440 | 1/1997 | WIPO . |
| WO97/01610 | 1/1997 | WIPO . |
| WO97/01726 | 1/1997 | WIPO . |
| WO97/01774 | 1/1997 | WIPO . |
| WO97/01778 | 1/1997 | WIPO . |
| WO97/01780 | 1/1997 | WIPO . |
| WO97/01781 | 1/1997 | WIPO . |
| WO97/01788 | 1/1997 | WIPO . |
| WO97/01789 | 1/1997 | WIPO . |
| WO97/07653 | 2/1997 | WIPO . |

*Primary Examiner*—William L. Sikes
*Assistant Examiner*—Tarifur R. Chowdhury
*Attorney, Agent, or Firm*—Harness, Dickey & Pierce, P.L.C.

[57] ABSTRACT

A light-scattering layer 1150, a polarized light separator 1160, and a polarized light separator 1180 are provided in this order below a TN liquid crystal 1140. The polarized light separators 1160 and 1180 are polarized light separators for reflecting light of a linearly polarized light of a wavelength region ($\Delta\lambda$) in the X direction, and transmitting light of an other wavelength region ($-\Delta\lambda$). Since the wavelength region ($\Delta\lambda$) of the polarized light separator 1160 and 1180 are different from each other, as viewed from the light incident side, in a voltage non-application section 1120, light that is reflected by the polarized light separator 1160 becomes emitted light 1122 of a color of the wavelength region ($\Delta\lambda 1$), and in a voltage application section 1110, light that is transmitted through the polarized light separator 1160 is reflected by the polarized light separator 1180 to become emitted light 1112 of a color of the wavelength region ($\Delta\lambda 2$). Therefore, as viewed from the light incident side, two-color display of the color of the wavelength region ($\Delta\lambda 2$) can be obtained on a color background of the wavelength region ($\Delta\lambda 1$).

24 Claims, 8 Drawing Sheets

DISPLAY DEVICES, ELECTRONIC APPARATUS USING THE SAME, AND POLARIZED LIGHT SEPARATOR

TECHNICAL FIELD

The present invention relates to a technical field of display devices, and more particularly, to a technical field of display devices such as reflective liquid crystal display devices which comprise a polarized light separator such as a polarizer and a reflective polarizer, and which reflects external light to effect two-color display, and an electronic apparatus such as a portable phone and a watch using the same.

BACKGROUND ART

In a conventional liquid crystal display device utilizing a variable transmission polarization axis optical element for rotating a polarization axis of transmitted light, such as a TN (Twisted Nematic) liquid crystal and an STN (Super-Twisted Nematic) liquid crystal, a structure is employed in which this variable transmission polarization axis optical element is sandwiched by two sheets of polarizers.

According to such an arrangement, only a polarized light component in a specific direction is transmitted through a first polarizer located on the side of a display screen of liquid crystal, and other polarized light components are absorbed by this first polarizer. The polarization direction of light transmitted through the first polarizer is selectively changed in response to an alignment state of liquid crystal that changes with voltage applied to the liquid crystal, and the light is incident on a second polarizer located on the other side of the liquid crystal.

In the case of a liquid crystal display device of a dot matrix system, for example, in a normally white mode, regarding each pixel, (i) in a state where a voltage is not applied to the liquid crystal, the light emitted from the liquid crystal is transmitted through the second polarizer, is further reflected by a reflecting plate located at the back thereof and thereafter, is transmitted through the second polarizer, the liquid crystal, and the first polarizer again to be emitted as display light from the display screen of the liquid crystal display device; and (ii) in a state where a voltage is applied to the liquid crystal, the light emitted from the liquid crystal is absorbed by the second polarizer, and display light is not emitted from the display screen, finally.

Alternatively, in the case of a liquid crystal display device of a segment system, for example, in a region containing segment electrodes, the display light is selectively emitted from the display screen as display light in response to a state of voltage application to the liquid crystal, as in the case of the above dot matrix system. On the other hand, in a region containing no segment electrode, the liquid crystal is always in a state of non-application of a voltage, and the external light is reflected by the reflecting plate through the polarizer and the liquid crystal to be emitted as display light from the display screen.

In this way, by controlling the quantity of display light emitted from the display screen for each of the pixels or each of the segments using the liquid crystal, polarizers and so forth arranged on the optical path while reflecting the external light incident from the display screen by a reflecting film provided inside the device, reflective display is effected.

In addition, some small liquid crystal display devices of the dot matrix system, segment system or the like for use in an electronic apparatus such as a portable phone or a wristwatch arrange two sheets of color polarizers perpendicular to each other at positions opposite to the liquid crystal to effect two-color display. The color polarizers have characteristics of transmitting a specific wavelength component (color component) and of absorbing other wavelength components (color components) when transmitting a polarized light component in a predetermined direction. According to the liquid crystal display device, a region of pixel electrodes or segment electrodes in the state of voltage application is displayed in a first color, such as red, blue, green and black, and a region of pixel electrodes or segment electrodes that is not in the state of voltage application and a background other than the region are displayed in a second color, such as cyan, yellow, orange, and white.

Since, however, a polarizer which is an example of a polarized light separator effects polarization by absorbing a polarized light component in a direction different from that of a specific polarization axis in the incident light, there is a problem of poor usage efficiency of the light.

In addition, in the case of the aforementioned small display device for effecting two-color display using two sheets of color polarizers, the usage efficiency of the light is also poor, so that there is a problem of a dark display.

The present invention is made in consideration of the above problems, and an object is to provide, in a display device utilizing a variable transmission polarization axis optical element such as a liquid crystal, a display device which can effect bright two-color display during reflective display and transmissive display employing at least external light, and an electronic apparatus and a polarized light separator using the same.

The above object of the present invention is achieved by a display device including: a variable transmission polarization axis means capable of varying a transmission polarization axis; a first polarized light separating means which is arranged on one side of the variable transmission polarization axis means, which transmits light of linearly polarized light component in a first direction, and which reflects or absorbs light of linearly polarized light component in a direction different from the first direction; a second polarized light separating means which is arranged on the other side of the variable transmission polarization axis means, which transmits light of linearly polarized light component in a second direction, and which reflects, of light of linearly polarized light component in a predetermined direction different from the second direction, a component of a first wavelength $\Delta\lambda 1$ and transmits a component of a wavelength $-\Delta\lambda 1$ different from the first wavelength component; and a third polarized light separating means which is placed on the side opposite to the variable transmission polarization axis means with respect to the second polarized light separating means, which transmits light of linearly polarized light component in a third direction, and which reflects, of light of linearly polarized light component in a predetermined direction different from the third direction, a component of a second wavelength region $\Delta\lambda 2$ and transmits a component of a wavelength region $-\Delta\lambda 2$ different from the second wavelength component.

According to the display device of the present invention, when external light is incident on the variable transmission polarization axis means from the side of the first polarized light separating means, the first polarized light separating means transmits light of linearly polarized light component in the first direction in the incident external light to the side of the variable transmission polarization axis means, and reflects or absorbs linearly polarized light component in a predetermined direction (for example, the direction perpendicular to or substantially perpendicular to the first direction) different from the first direction. Next, the second polarized light separating means transmits, of the light incident through the first polarized light separating means and the variable transmission polarization axis means, light of linearly polarized light component in the second direction to the side opposite to the variable transmission polarization axis means, reflects the component of the first wavelength region $\Delta\lambda 1$ in the linearly polarized light components in a predetermined direction (for example, the direction perpendicular to or substantially perpendicular to the second direction) different from the second direction, and transmits the component of the wavelength region $-\Delta\lambda 1$ (for example, the component of the wavelength region other than the wavelength region $\Delta\lambda 1$) different from the component in the first wavelength region $\Delta\lambda 1$. Next, the third polarized light separating means transmits, of the light incident through the first polarized light separating means, the variable transmission polarization axis means, and the second polarized light separating means, light of linearly polarized light component in the third direction to the side opposite to the second polarized light separating means, reflects the component of the second wavelength region $\Delta\lambda 2$ in the linearly polarized light components in a predetermined direction (for example, the direction perpendicular to or substantially perpendicular to the third direction) different from the third direction, and transmits the component of the wavelength region $-\Delta\lambda 2$ (for example, the component of the wavelength region other than the wavelength region $\Delta\lambda 2$) different from the component in the second wavelength region $\Delta\lambda 2$. As a result of the foregoing, either of the component of the first wavelength region $\Delta\lambda 1$ reflected from the second polarized light separating means or the component of the second wavelength region $\Delta\lambda 2$ reflected from the third polarized light separating means is selectively emitted from the first polarized light separating means in response to the direction of the transmission polarization axis in the variable transmission polarization axis means.

Alternatively, when external light is incident on the variable transmission polarization axis means from the side of the third polarized light separating means, the third polarized light separating means first transmits, of the incident light, light of linearly polarized light component in the third direction to the side of the second polarized light separating means, reflects the component of the second wavelength region $\Delta\lambda 2$ in the linearly polarized light components in a predetermined direction (for example, the direction perpendicular to or substantially perpendicular to the third direction) different from the third direction, and transmits the component of the wavelength region $-\Delta\lambda 2$ (for example, the component of the wavelength region other than the wavelength region $\Delta\lambda 2$) different from the second wavelength region $\Delta\lambda 2$. Next, the second polarized light separating means transmits, of the light incident through the third polarized light separating means, light of linearly polarized light component in the second direction to the side of the variable transmission polarization axis means, reflects the component of the first wavelength region $\Delta\lambda 1$ in the linearly polarized light components in a predetermined direction (for example, the direction perpendicular to or substantially perpendicular to the second direction) different from the second direction, and transmits the component of the wavelength region $-\Delta\lambda 1$ (for example, the component of the wavelength region other than the wavelength region $\Delta\lambda 1$) different from the component of the first wavelength region $\Delta\lambda 1$. Next, the first polarized light separating means transmits light of the linearly polarized light component in the first direction in the external light incident through the third polarized light separating means, the second polarized light separating means, and the variable transmission polarization axis means to the side opposite to the variable transmission polarization axis means, and reflects or absorbs the linearly polarized light component in a predetermined direction (for example, the direction perpendicular to or substantially perpendicular to the first direction) different from the first direction. Here, if the light transmitted through the first polarized light separating means is returned in this way by a reflecting plate or the like, the reflected light passes through the first polarized light separating means, the variable transmission polarization axis means, the second polarized light separating means, and the third polarized light separating means in the order reverse to the above order. As a result of the forgoing, either of the component of the first wavelength region $-\Delta\lambda 1$ to be transmitted through the second polarized light separating means or the component of the wavelength region $-\Delta\lambda 2$ to be transmitted through the third polarized light separating means is selectively emitted from the third polarized light separating means in response to the direction of the transmission polarization axis in the variable transmission polarization axis means. Incidentally, together with this emitted light, the component of the first wavelength region $\Delta\lambda 1$ reflected from the second polarized light separating means and the component of the second wavelength region $\Delta\lambda 2$ reflected from the third polarized light separating means are also emitted.

In this way, the second polarized light separating means effects polarized light separation by reflecting, of the incident light, the component of the first wavelength region $\Delta\lambda 1$ in the linearly polarized light components different from the second linearly polarized light component. In addition, the third polarized light separating means effects polarization separation by reflecting, of the incident light, the component of the second wavelength region $\Delta\lambda 2$ in the linearly polarized light components different from the third linearly polarized light component. For this reason, as compared with a conventional display device using a polarizer for effecting polarization separation by transmitting a linearly polarized light component in one direction, and absorbing a linearly polarized light component in the other direction that is perpendicular to the one linearly polarized light component, the linearly polarized light component reflected from the polarized light separating means is utilized, so that bright reflective display can be obtained.

In this case, it is possible to effect two-color display of a first color (for example, background color) composed of the component of the first wavelength region $\Delta\lambda 1$ reflected from the second polarized light separating means to be emitted as display light, and a second color (for example, color of letters and numeric characters) composed of the component of the second wavelength region $\Delta\lambda 2$ reflected from the third polarized light separating means to be emitted as display light. Alternatively, it is possible to effect two-color display of a first color (for example, background color) composed of the component of the wavelength region $-\Delta\lambda 1$ transmitted through the second polarized light separating means to be emitted as display light, and a second color (for example, color of letters and numeric characters) composed of the component of the wavelength region $-\Delta\lambda 2$ transmitted through the third polarized light separating means to be emitted as display light. In particular, regarding the second and third polarized light separating means, it is possible to effect two-color display of desired colors by selecting the first and second wavelength regions $\Delta\lambda 1$ and $\Delta\lambda 2$ at the design stage.

As a result of the foregoing, the display device of the present invention allows reflective or transmissive two-color display of bright colors using external light to be effected.

According to one form of the display device of the present invention, the variable transmission polarization axis means is constructed by including liquid crystal. That is, the display device is constructed as a liquid crystal display device.

In this case, the liquid crystal may be a TN liquid crystal, an STN liquid crystal, or an ECB liquid crystal. With this arrangement, bright and high-quality two-color display can be effected with relative ease. Incidentally, this STN liquid crystal includes an STN liquid crystal using a color compensating optical anisotropic body.

According to another form of the display device of the present invention, the first polarized light separating means consists of a polarizer which transmits light of linearly polarized light component in the first direction and which absorbs light of a linearly polarized light component in the direction perpendicular to the first direction.

According to this form, the polarizer transmits the linearly polarized light component in the first direction in the incident light as linearly polarized light component in the first direction, and absorbs the linearly polarized light component in the direction perpendicular to the first direction. Therefore, two-color display can be effected on the basis of the light that is transmitted through the polarizer.

According to still another form of the display device of the present invention, the second polarized light separating means consists of a reflective polarizer which transmits light of linearly polarized light component in the second direction and which reflects light of a component of the first wavelength region $\Delta\lambda 1$ in the linearly polarized light component in the direction perpendicular to the second direction.

According to this form, the reflective polarizer transmits the linearly polarized light component in the second direction in the light incident from the side of the variable transmission polarization axis means or from the side of the third polarized light separating means as the linearly polarized light component in the second direction, and reflects, of light of the linearly polarized light component in the direction perpendicular to the second direction, the component of the first wavelength region $\Delta\lambda 1$ as the linearly polarized light component in the perpendicular direction, and transmits the component of the wavelength region $-\Delta\lambda 1$ as the linearly polarized light component in the perpendicular direction. Therefore, when external light is incident from the side of the first polarized light separating means, the component of the first wavelength region $\Delta\lambda 1$ reflected by the reflective polarizer is emitted as display light from the side of the third polarized light separating means to effect the display of the first color. Alternatively, when external light is incident from the side of the third polarized light separating means, the component of the wavelength region $-\Delta\lambda 1$ transmitted by the reflective polarizer is emitted as display light from the side of the third polarized light separating means to effect display of the first color.

In this form, the reflective polarizer may consist of a laminated product in which a first layer having birefringence and a second layer having a refractive index that is substantially equal to any one of a plurality of refractive indexes of the first layer and having no birefringence are alternately laminated.

In the reflective polarizer constructed as described above, light of the linearly polarized light component in the second direction in the light incident on one main surface of the reflective polarizer from the lamination direction is transmitted as light of the linearly polarized light component of the second direction to the side of the opposite side other main surface. And, of the light of the linearly polarized light component in the direction perpendicular to the second direction, the component of the first wavelength region $\Delta\lambda 1$ is reflected as light of the linearly polarized light component in the perpendicular direction, and the component of the wavelength region $-\Delta\lambda 1$ is transmitted as the light of the linearly polarized light component in the perpendicular direction. In addition, light of the linearly polarized light component in the second direction in the light incident on the other main surface of the reflective polarizer from the lamination direction is transmitted as the linearly polarized light component in the second direction to the side of the opposite one main surface. And, of the light of the linearly polarized light component in the direction perpendicular to the second direction, the component of the first wavelength region $\Delta\lambda 1$ is reflected as light of the linearly polarized light in the perpendicular direction, and the component of the wavelength region $-\Delta\lambda 1$ is transmitted as light of the linearly polarized light in the perpendicular direction.

According to a further form of the display device of the present invention, the third polarized light separating means consists of a reflective polarizer which transmits light of linearly polarized light component in the third direction and which reflects light of a component of the second wavelength region $\Delta\lambda 2$ in the linearly polarized light component in the direction perpendicular to the third direction.

According to this form, the reflective polarizer transmits the linearly polarized light component in the third direction in the light incident from the side of the second polarized light separating means or from the side opposite thereto as the linearly polarized light component in the third direction, and reflects, of the light of the linearly polarized light component in the direction perpendicular to the third direction, the component of the second wavelength region $\Delta\lambda 2$ as the linearly polarized light component in the perpendicular direction, and transmits the component of the wavelength region $-\Delta\lambda 2$ as the linearly polarized light component in the perpendicular direction. Therefore, when external light is incident from the side of the first polarized light separating means, the component of the second wavelength region $\Delta\lambda 2$ reflected by the reflective polarizer is emitted as display light from the side of the third polarized light separating means to effect display of the second color. Alternatively, when external light is incident from the side of the third polarized light separating means, the component of the wavelength region $-\Delta\lambda 2$ transmitted by the reflective polarizer is emitted as display light from the side of the third polarized light separating means to effect the display of the second color.

In this form, the reflective polarizer may consist of a laminated product in which a first layer having birefringence and a second layer having a refractive index that is substantially equal to any one of a plurality of refractive indexes of the first layer and having no birefringence are alternately laminated.

In the reflective polarizer constructed as described above, light of the linearly polarized light component in the third direction in the light incident on one main surface of the polarizer from the lamination direction is transmitted as light of the linearly polarized light component of the third direction to the side of the opposite side other main surface. And, of the light of the linearly polarized light component in the direction perpendicular to the third direction, the component of the second wavelength region $\Delta\lambda 2$ is reflected as light of the linearly polarized light component in the perpendicular direction, and the component of the wavelength region $-\Delta\lambda 2$ is transmitted as light of the linearly polarized light component in the perpendicular direction. In addition, light of the linearly polarized light component in the third direction in the light incident on the other main surface of the reflective polarizer from the lamination direction is transmitted as the linearly polarized light component in the third direction to the side of the opposite one main surface. And, of the light of the linearly polarized light component in the direction perpendicular to the third direction, the component of the second wavelength region $\Delta\lambda 2$ is reflected as light of the linearly polarized light in the perpendicular direction, and the component of the wavelength region $-\Delta\lambda 2$ is transmitted as light of the linearly polarized light in the perpendicular direction.

According to a still further form of the display device of the present invention, the angle formed by the second direction and the third direction is 45° to 90°.

According to this form, color contrast reaches a practical level when the angle formed by the second and third directions is 45°, and high-purity and high-contrast two-color display can be obtained as the angle increases close to 90°.

In this form, the angle formed by the second direction and the third direction may preferably be 60° to 90°.

According to this form, the color contrast is fairly improved when the angle formed by the second and third directions is 60°, and high-purity and high-contrast two-color display can be obtained as the angle increases close to 90°.

In this form, the angle formed by the second direction and the third direction may preferably be 75° to 90°.

According to this form, the color contrast is considerably improved when the angle formed by the second and third directions is 75°, and high-purity and high-contrast two-color display can be obtained as the angle increases close to 90°.

According to another form of the display device of the present invention, a transmissive light-diffusing layer is further included between the variable transmission polarization axis means and the second polarized light separating means.

According to this form, two-color display which is not in the form of a mirror surface (in the form of a paper) can be effected by the light that is reflected from the second polarized light separating means and the third polarized light separating means, respectively, and is emitted as display light. However, the two-color display that is a mirror surface display may be effected without positively providing such a light-diffusing layer.

According to a further form of the display device of the present invention, a transmissive light-diffusing layer is further included between the second polarized light separating means and the third polarized light separating means.

According to this form, when external light is incident from the side of the first polarized light separating means, one-color display which is not in the form of the mirror surface (in the form of paper) by the light that is reflected from the second polarized light separating means and emitted as display light, and one-color display which is in the form of the mirror surface by the light reflected from the third polarized light separating means and emitted as display light can be effected in combination. Alternatively, when external light is incident from the side of the third polarized light separating means, two-color display which is not in the form of a mirror surface (in the form of a paper) can be effected by the light that is transmitted by the second polarized light separating means and the third polarized light separating means, respectively, and is emitted as display light.

According to a still further form of the display device of the present invention, a light-absorbing means is further included on the side opposite to the second polarized light separating means with respect to the third polarized light separating means.

According to this form, in particular, when external light is incident from the side of the first polarized light separating means as described above, the component of the wavelength region $-\Delta\lambda 1$ and the component of the wavelength region $-\Delta\lambda 2$ are absorbed by the light-absorbing means after being transmitted through the third polarized light separating means. Therefore, these components can be prevented from being emitted by being mixed to the component of the wavelength region $\Delta\lambda 1$ and the component of the wavelength region $\Delta\lambda 2$ that are the display light in this case, so that two-color display of vibrant colors can be effected.

According to another form of the display device of the present invention, a light source for illuminating the variable transmission polarization axis means is further included.

According to this form, on one hand, it is possible to effect the above-described two-color display mainly utilizing external light in a bright place, and on the other hand, it is possible to effect transmissive two-color display mainly utilizing a light source such as a backlight in a dark place. In the latter case, the light from the light source may be transmitted through the second and third polarization separation means so as to be emitted as display light.

According to a further form of the display device of the present invention, a reflecting means is further included on the side opposite to the variable transmission polarization axis means of the first polarized light separating means.

According to this form, in particular, when external light is incident from the side of the third polarized light separating means as described above, the component of the wavelength region $-\Delta\lambda 1$ and the component of the wavelength region $-\Delta\lambda 2$ are reflected by the reflecting means after being transmitted through the first polarized light separating means. Therefore, these components reflected by the reflecting means are emitted as display light from the side of the third polarized light separating means, so that two-color display of vibrant colors can be effected.

The above object of the present invention is also achieved by a polarized light separator including: one polarized light separating means which transmits light of linearly polarized component in one direction, and which reflects, of light of linearly polarized light component in a predetermined direction different from the one direction, a component of a first wavelength region $\Delta\lambda 1$ and which transmits a component of a wavelength region $-\Delta\lambda 1$ different from the first wavelength component; and another polarized light separating means which is located oppositely to said one polarized light separating means, which transmits light of linearly polarized light component in the other direction, which reflects, of light of linearly polarized light component in a predetermined direction different from the other direction, a component of a second wavelength region $\Delta\lambda 2$ and which transmits a component of a wavelength region $-\Delta\lambda 2$ different from the second wavelength component.

According to the polarized light separator, one polarized light separating means transmits, of the light incident from the opposite side of the other polarized light separating means, light of the linearly polarized light component of one direction, reflects the component of the first wavelength region $\Delta\lambda 1$ in the linearly polarized light components in a predetermined direction different from the one direction, and transmits the component of the first wavelength region $-\Delta\lambda 1$ different from the component of the first wavelength region Δλ1. In addition, the other polarized light separating means transmits, of the light incident from the side of one polarization separation means, light of the linearly polarized component in the other direction to the side opposite to the one polarized light separating means, reflects the component of the second wavelength region Δλ2 in the linearly polarized light component in a predetermined direction different from the other direction, and transmits the component of the wavelength region −Δλ2 different from the second wavelength region Δλ2.

In this way, if the one and the other polarized light separating means each consisting of, for example, the aforementioned reflective polarizer are employed as the second and third polarized light separating means in the aforementioned display device of the present invention, respectively, the linearly polarized light component reflected by the polarized light separator is utilized, so that bright display can be obtained. At the same time, it is possible to effect two-color display of desired colors. Incidentally, these two polarized light separating means may be combined by disposed closely, heating and pressurizing, or bonding by an adhesive. In particular, heating and pressurizing makes manufacturing easy.

The above object of the present invention is also achieved by an electronic apparatus comprising a display device as claimed in claim 1.

According to the electronic apparatus of the present invention, since the above-described display device of the present invention is included, various types of electronic apparatuses capable of effecting at least reflective or transmissive two-color display of bright colors by external light can be realized. Incidentally, the display device in any one of the above-described forms may be incorporated into the electronic apparatus of the present invention in some applications thereof.

The above object of the present invention is also achieved by a display device including: a variable transmission polarization axis optical element; a first polarized light separator which is arranged on one side of the variable transmission polarization axis optical element, and which is of a type for effecting polarization separation by reflection or absorption; a second polarized light separator which is placed on the other side of the variable transmission polarization axis optical element, and which is of a type for effecting polarization separation by reflection for every wavelength of light; and a third polarized light separator which is arranged on the side opposite to the variable transmission polarization axis optical element with respect to the second polarized light separator, and which is of a type for effecting polarization separation by reflection for every wavelength of light.

According to this display device, since the second and third polarized light separators effect polarization separation by reflection for every wavelength of light, that is, by reflecting a component of a specific wavelength in the linearly polarized light components in the direction different from the specific direction, as compared with the conventional display device using a plurality of color polarizers effecting polarization separation by absorption, the reflected linearly polarized light component is utilized, two-color display of bright colors by external light can be obtained.

Incidentally, even if the display device of the present invention as described above is constructed as the display device of any known driving system, such as a passive matrix system, an active matrix system using TFT (Thin Film Transistor) or TFD (Thin Film Diode), and a segment system, two-color display of bright colors can be realized.

In addition, as the polarized light separating means of the present invention, in addition to the above reflective polarizer, for example, means of a combination of cholesteric liquid crystal layer and (¼)λ film, means for separating into reflected polarized light and transmitted polarized light utilizing Brewster angle (pages 427 to 429 of SID 92 DIGEST), means utilizing a hologram, means disclosed in the international-published international applications (International Publication Nos.: WO95/27819 and WO95/17692) may be employed. Incidentally, these various types of polarized light separators can be similarly used in place of the reflective polarizer in the embodiments to be described later.

BEST MODE FOR CARRYING OUT THE INVENTION

Hereinafter, the best mode for carrying out the present invention will be described for each of the embodiments with reference to the drawings.
(Principle of Operation)

First, the principle of operation of a liquid crystal display device according to respective embodiments of the present invention will be described with reference to FIGS. 1 to 5.

Figure 1:
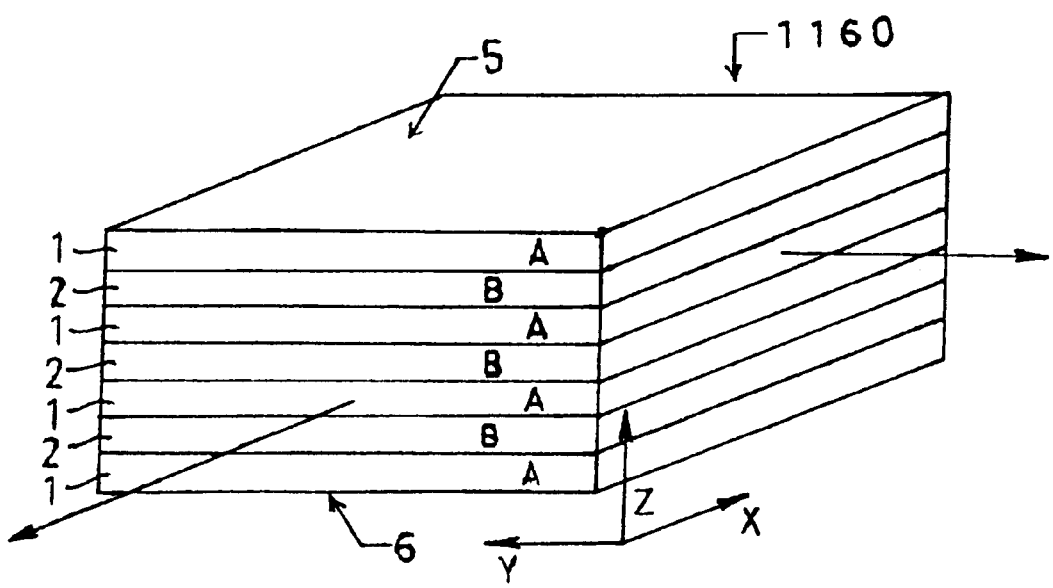
FIG. 1 is a schematic perspective view of a polarized light separator used in embodiments of the present invention.

FIG. 1 is a schematic perspective view of a reflective polarizer that is an example of a polarized light separator used in the respective embodiments of the present invention. Incidentally, a basic configuration of such a reflective polarizer is disclosed in Japanese Patent Laid-Open No. 9-506985 (International application gazette No.: WO/95/17692) and International application gazette No.: WO/95/27819.

A polarized light separator 1160 has a structure of a plurality of layers formed by alternately laminating two different layers 1 (A-layers) and 2 (B-layers). The refractive index (nAX) in the X direction and the refractive index (nAY) in the Y direction of the A-layers 1 are different from each other. The refractive index (nBX) in the X direction and the refractive index (nBY) in the Y direction of the B-layers 2 are equal to each other. In addition, the refractive index (nAY) in the Y direction of the A-layers 1 and the refractive index (nBY) in the Y direction of the B-layers 2 are equal to each other.

Therefore, linearly polarized light in the Y direction in the light incident on the polarized light separator 1160 from the direction perpendicular to the top surface 5 of this polarized light separator 1160 is transmitted through this polarized light separator 1160 and is emitted from the bottom surface 6 as linearly polarized light in the Y direction. Conversely, linearly polarized light in the Y direction in the light incident on the polarized light separator 1160 from the direction perpendicular to the bottom surface 6 of the polarized light separator 1160 is transmitted through this polarized light separator 1160 and is emitted from the top surface 5 as linearly polarized light in the Y direction. Here, the direction to be transmitted (the Y direction in this example) is called a transmission axis.

On the other hand, if the thickness of the A-layer 1 in the Z direction is taken as tA, the thickness of the B-layer 2 in the Z direction is taken as tB, and the wavelength of the incident light is taken as $\lambda$, by setting these to satisfy the following, $$tA \cdot nAX + tB \cdot nBX = \lambda/2 \tag{1}$$

linearly polarized light in the X direction in light having the wavelength $\lambda$ that is incident on the polarized light separator 1160 from the direction perpendicular to the top surface 5 of the polarized light separator 1160 is reflected by this polarized light separator 1160 as linearly polarized light in the X direction. In addition, linearly polarized light having the wavelength $\lambda$ to the bottom surface 6 of the polarized light separator 1160 is reflected by this polarized light separator 1160 as linearly polarized light in the X direction. Here, the direction to be reflected(the X direction in this example) is called a reflection axis.

By variously changing the thickness tA of the A-layer 1 in the Z direction and the thickness tB of the B-layer 2 in the Z direction so that above (1) holds over a certain wavelength range of visible light, of linearly polarized light components in the X direction, only light in a certain wavelength region ($\Delta\lambda$) is reflected, and light of other wavelength region ($-\Delta\lambda$) is transmitted. That is, the linearly polarized light component in the Y direction is transmitted as linearly polarized light in the Y direction, light which is the linearly polarized light component in the X direction and of a certain wavelength region ($\Delta\lambda$) is reflected as linearly polarized light in the X direction, and light which is the linearly polarized component in the X direction, and of other wavelength region ($-\Delta\lambda$) is transmitted as linearly polarized light in the X direction.

Figure 2:
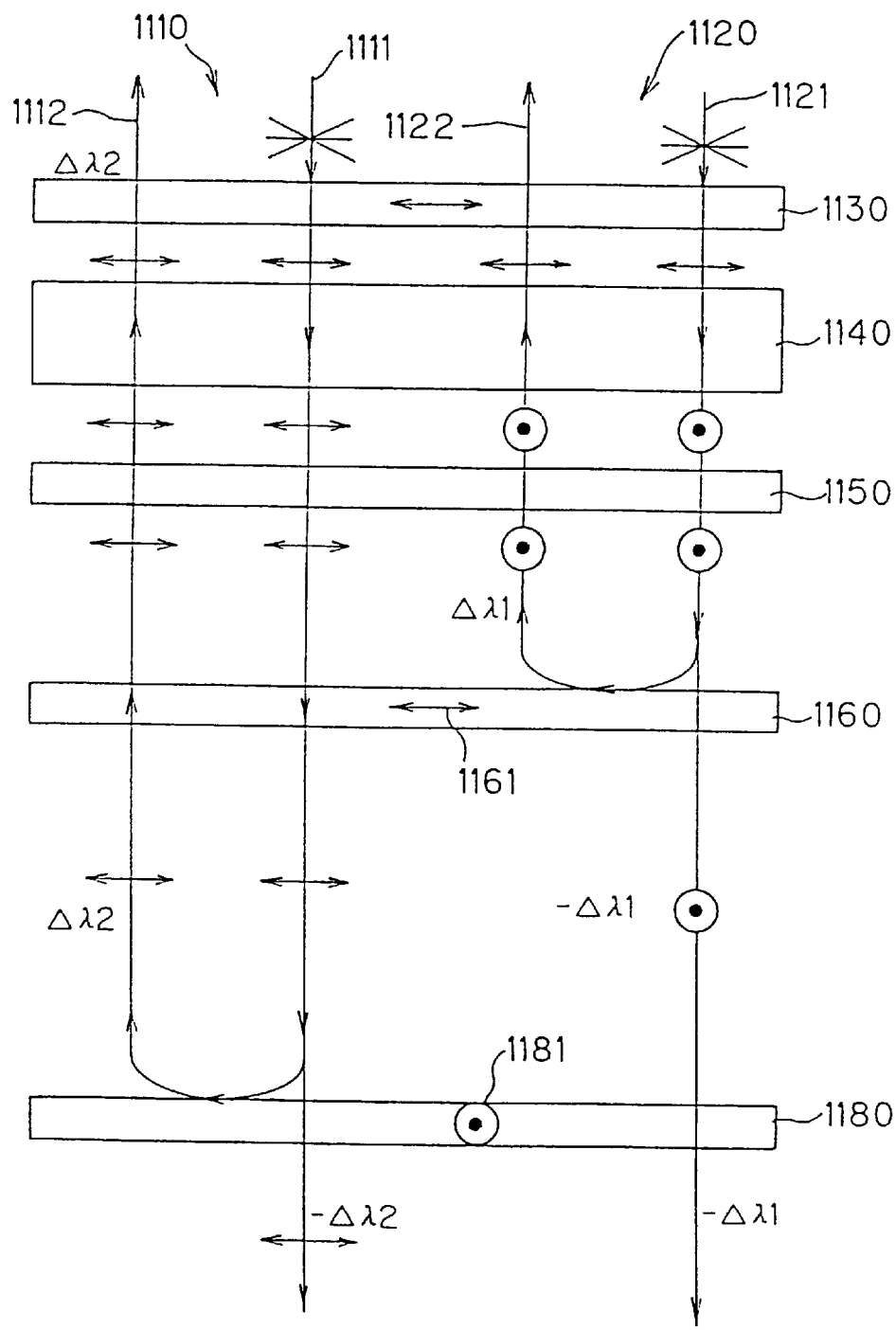
FIG. 2 is a view for explaining one principle of operation in the embodiments of the present invention.

FIG. 2 is a view for explaining one principle of operation using the polarized light separators 1160 and 1180 in the embodiments of the present invention. Incidentally, a liquid crystal display device shown in this drawing is intended for explaining the principle of the present invention, and it is needless to say that the present invention is not limited to the liquid crystal display device shown in the drawing.

As shown in FIG. 2, in this liquid crystal display device, a TN liquid crystal 1140 is used as a variable transmission polarization axis optical element. A polarizer 1130 is provided above the TN liquid crystal 1140. A light-scattering layer 1150, a polarized light separator 1160, and a polarized light separator 1180 are provided in this order below the TN liquid crystal 1140. The polarized light separator 1160 reflects light of a certain wavelength region ($\Delta\lambda 1$) in the direction of the reflection axis, and transmits light of other wavelength region ($-\Delta\lambda$) in the direction of the reflection axis. In addition, the polarized light separator 1180 reflects light of a certain wavelength region ($\Delta\lambda 2$) which is different from $\Delta\lambda 1$ in the direction of the reflection axis, and transmits light of other wavelength region ($-\Delta\lambda 2$) in the reflection axis. The angle formed by a transmission axis 1161 of the polarized light separator 1160 and a transmission axis 1181 of the polarized light separator 1180 is 90°.

The principle of operation of the liquid crystal display device will be described with reference to FIG. 2 taking the left side of the liquid crystal display device as a voltage application section 1110, and taking the right side as a voltage non-application section 1120.

In the right-side voltage non-application section 1120, light 1121 incident as external light is changed by the polarizer 1130 to linearly polarized light in the direction parallel to the plane of the drawing and thereafter, the polarization direction is twisted 90° by the TN liquid crystal 1140 to become linearly polarized light in the direction perpendicular to the plane of the drawing, and light of the wavelength region ($\Delta\lambda 1$) is reflected by the polarized light separator 1160, and light of the wavelength region ($-\Delta\lambda 1$) is transmitted. The reflected light of the wavelength region ($\Delta\lambda 1$) becomes linearly polarized light in the direction perpendicular to the plane of the drawing, and the polarization direction is twisted 90° by the TN liquid crystal 1140 to be linearly polarized light in the direction parallel to the plane of the drawing, and is emitted as linearly polarized light in the direction parallel to the plane of the drawing from the polarized 1130. That is, a color of the wavelength region ($\Delta\lambda 1$) can be viewed on the side of the top surface of the polarizer 1130. On the other hand, the transmitted light of the wavelength region ($-\Delta\lambda 1$) becomes linearly polarized light in the direction perpendicular to the plane of the drawing to be transmitted through the polarized light separator 1180. That is, a color of the wavelength region ($-\Delta\lambda 1$) can be viewed on the side of the bottom surface of the polarized light separator 1180. In this way, when no voltage is applied, as viewed from the light incident side, the incident light is not absorbed but reflected by the polarized light separator 1160, so that bright color display of the wavelength region ($\Delta\lambda 1$) can be obtained. Incidentally, since the light-scattering layer 1150 is provided between the polarized light separator 1160 and the TN liquid crystal 1140, the reflected light from the polarized light separator 1160 is in the form of a paper rather than a mirror surface. In addition, as viewed from the side opposite to the light incident side, color display of the wavelength region ($-\Delta\lambda 1$) can be obtained by the polarized light separator 1160 and the polarized light separator 1180 on the basis of the incident light.

In the left-side voltage application section 1110, light 1111 incident as external light is changed by the polarizer 1130 to linearly polarized light in the direction parallel to the plane of the drawing and thereafter, is transmitted through the TN liquid crystal 1140 without changing the polarization direction, and is changed by the polarized light separator 1160 to linearly polarized light in the direction parallel to the plane of the drawing. The linearly polarized light transmitted through the polarized light separator 1160 is incident on the polarized light separator 1180, and of the linearly polarized light incident on the polarized light separator 1180 is reflected, the light of the wavelength region ($\Delta\lambda 2$) is reflected and the light of the wavelength region ($-\Delta\lambda 2$) is transmitted. Reflected light of the wavelength region ($\Delta\lambda 2$) is transmitted through the TN liquid crystal 1140 as the linearly polarized light in the direction parallel to the plane of the drawing without changing the polarization direction, and is reflected by the polarizer 1130 as the linearly polarized light in the direction parallel to the plane of the drawing. That is, a color of the wavelength ($\Delta\lambda 2$) can be viewed on the side of the top surface of the polarizer 1130. On the other hand, the light of the wavelength region $(-\Delta\lambda 2)$ transmitted through a third polarized light separator is transmitted as it is. That is, a color of the wavelength region $(-\Delta\lambda 2)$ can be viewed on the side of the bottom surface of the polarized light separator 1180.

In this way, as viewed from the light incident side, in the voltage non-application section 1120, the light reflected by the polarized light separator 1160 becomes emitted light 1122 of the color of the wavelength region $(\Delta\lambda 1)$, and in the voltage application section 1110, the light transmitted through the polarized light separator 1160 is reflected by the polarized light separator 1180 to become emitted light 1112 of the color of the wavelength region $(\Delta\lambda 2)$. Therefore, as viewed from the light incident side, display of the color of the wavelength region $(\Delta\lambda 2)$ can be obtained on a color ground of the wavelength region $(\Delta\lambda 1)$.

In addition, as viewed from the side opposite to the light incident side, in the voltage non-application section 1120, the light transmitted by the polarized light separator 1160 becomes emitted light 1123 of a color of the wavelength region $(-\Delta\lambda 1)$, and in the voltage application section 1110, the light transmitted through the polarized light separator 1160 is also transmitted through the polarized light separator 1180 to become emitted light 1113 of a color of the wavelength region $(-\Delta\lambda 2)$. Therefore, as viewed from the side opposite to the light incident side, display of the color of the wavelength region $(-\Delta\lambda 2)$ can be obtained on a color ground of the wavelength region $(-\Delta\lambda 1)$.

Figure 3:
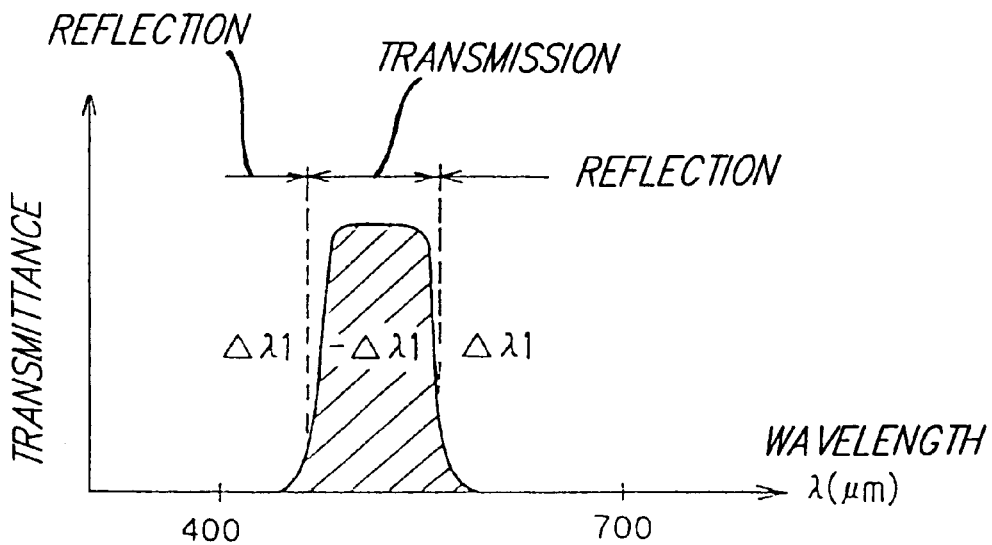
FIG. 3 is a characteristic diagram showing transmittance characteristics of one polarized light separator shown in FIG. 2 with respect to wavelength.
Figure 4:
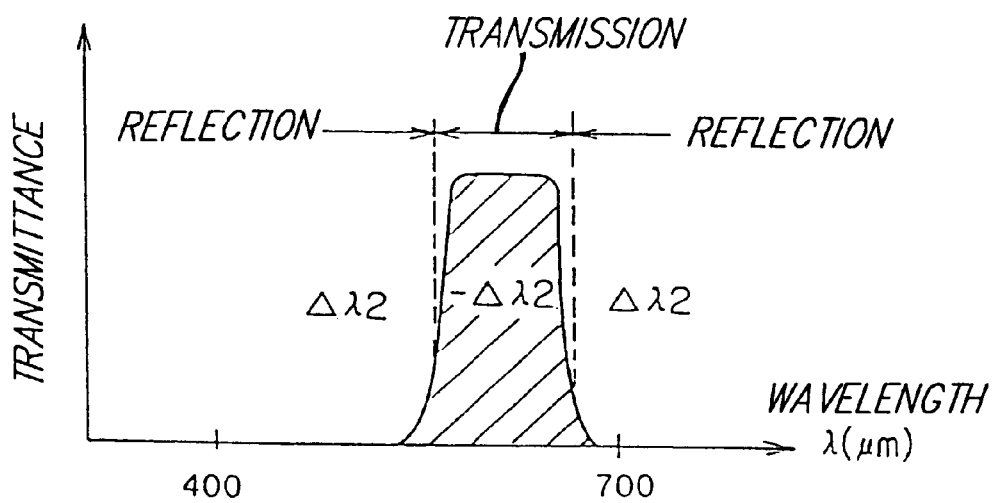
FIG. 4 is a characteristic diagram showing transmittance characteristics of the other polarized light separator shown in FIG. 2 with respect to wavelength.

FIGS. 3 and 4 show transmittance characteristics of the above-descried polarized light separators 1160 and 1180 with respect to the wavelength, respectively.

As shown in FIG. 3, the polarized light separator 1160 reflects the light of which the polarization direction is perpendicular to the plane of the drawing in FIG. 2 in the wavelength region $(\Delta\lambda 1)$ where the above expression (1) holds, and transmits the above light in the wavelength region $(-\Delta\lambda 1)$ where the above expression (1) does not hold. Incidentally, in this case, the polarized light separator 1160 transmits the light of which the polarization direction is parallel to the plane of the drawing in FIG. 2.

As shown in FIG. 4, the polarized light separator 1180 reflects the light of which the polarization direction is parallel to the plane of the drawing in FIG. 2 in the wavelength region $(\Delta\lambda 2)$ where the above expression (1) holds, and transmits the above light in the wavelength region $(-\Delta\lambda 2)$ where the above expression (1) does not hold. Incidentally, in this case, the polarized light separator 1180 transmits the light of which the polarization direction is parallel to the plane of the drawing in FIG. 2.

As will be understood from FIGS. 3 and 4, according to the present invention, the external light incident from the upper side of the polarizer 1130 in FIG. 2 is selectively reflected by the polarized light separators 1160 and 1180, thereby being emitted to the upper side of the polarizer 1130 as display light of the wavelength region $\Delta\lambda 1$ or $\Delta\lambda 2$ in response to the voltage applied to the TN liquid crystal 1140, and reflective two-color display is effected. In this case, the more the wavelength region $(-\Delta\lambda 1)$ and the wavelength region $(\Delta\lambda 2)$ are matched, the higher contrast two-color display can be obtained. For this reason, it is ideally preferable to match the two regions (that is, to satisfy $-\Delta\lambda 1= \Delta\lambda 2$). However, the two-color display can be obtained even if these are not matched. In particular, even if the characteristic curves shown in FIGS. 3 and 4 change gently rather than steeply, that is, even if the transmittance changes from 0% to 100% in a wide transition region, the two-color display can be obtained. Furthermore, even if two polarized light separators are used in combination each having a high-pass filter or a low-pass filter characteristic curve unlike the band-pass filter characteristic curve as shown in FIGS. 3 and 4, the two-color display is obtained.

Incidentally, the external light incident from the upper side of the polarizer 1130 in FIG. 2 is selectively transmitted by the polarized light separators 1160 and 1180, thereby being emitted as light of the wavelength region $(-\Delta\lambda 1)$ or of the wavelength region $(-\Delta\lambda 2)$ to the lower side of the polarized light separator 1180 in response to the voltage applied to the TN liquid crystal 1140, so that transmissive two-color display can be effected by using the transmitted light.

Incidentally, while a description has been given taking the TN liquid crystal 140 as an example in the foregoing, the basic principle of operation is equal even if another liquid crystal such as the STN liquid crystal or the ECB (Electrically Controlled Birefringence) liquid crystal capable of changing the transmission polarization axis by a voltage or the like is used in place of the TN liquid crystal 140.

As a result of the foregoing, the reflective two-color display of bright colors using the external light is effected by the principle of operation that is described with reference to FIG. 2.

Figure 5:
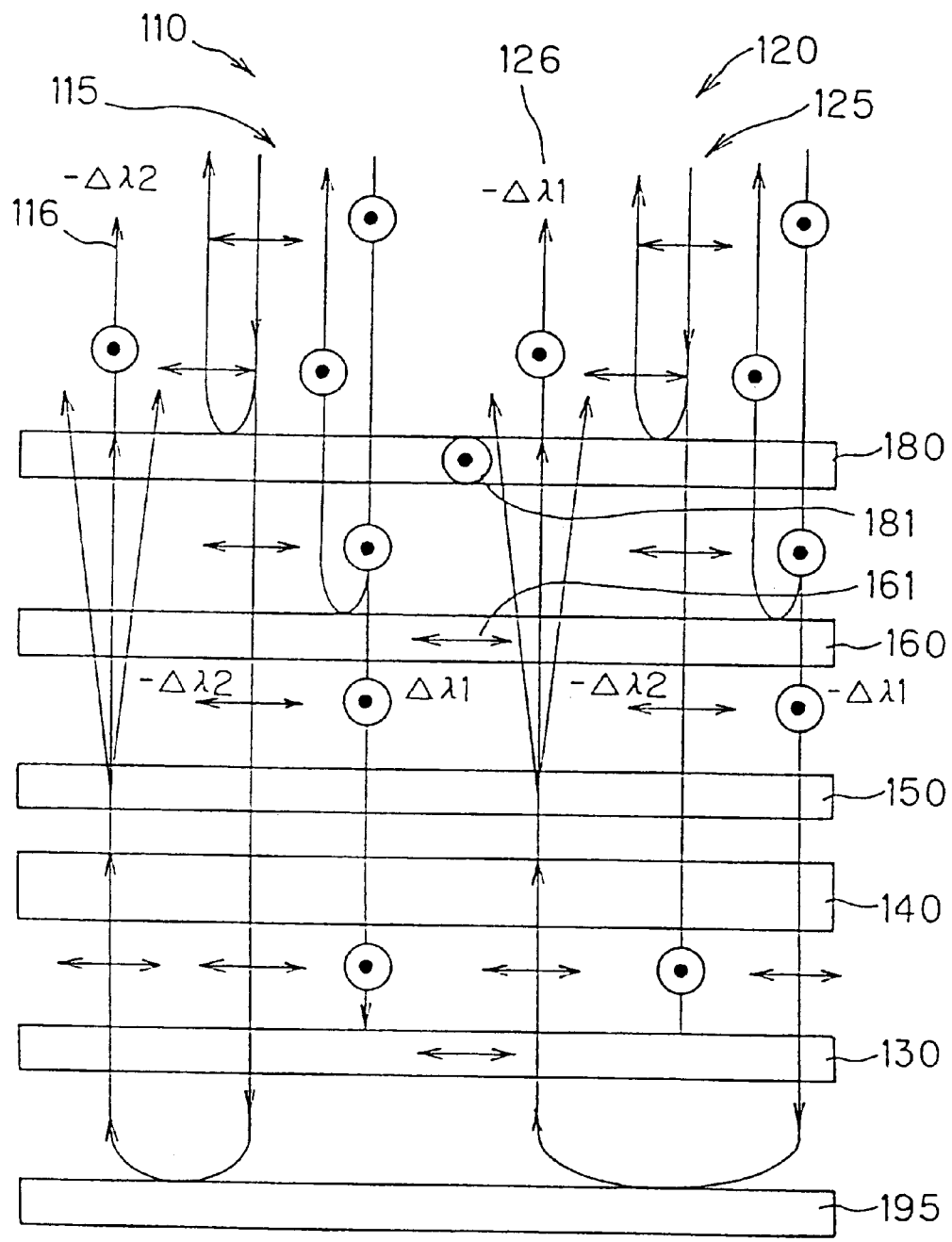
FIG. 5 is a view for explaining another principle of operation in the embodiments of the present invention.

FIG. 5 is a view for explaining another principle of operation using polarized light separators 160 and 180 in the embodiment of the present invention.

As show in FIG. 5, in this liquid crystal display device, a TN liquid crystal 140 is used as the variable transmision polarization axis optical element. A polarizer 130 and a reflecting plate 195 are provided below the TN liquid crystal 140, and a light-scattering layer 150, a polarized light separator 160, and a polarized light separator 180 are provided in this order above the TN liquid crystal 140. The polarized light separator 160 reflects light of a certain wavelength region $(\Delta\lambda 1)$ in the direction of the reflection axis, and transmits light of other wavelength $(-\Delta\lambda 1)$ in the direction of the reflection axis. The polarized light separator 180 reflects light of a certain wavelength region $(\Delta\lambda 2)$ in the direction of the reflection axis different from $\Delta\lambda 1$, and transmits light of other wavelength region $(-\Delta\lambda 2)$ in the direction of the reflection axis. The angle formed by a transmission axis 161 of the polarized light separator 160 and a transmission axis 181 of the polarized light separator 180 is 90°.

In the right-side voltage non-application section 120, light which is in the direction perpendicular to the transmission axis 181 of the polarized light separator 180 and of the wavelength region $(-\Delta\lambda 2)$ in light 125 is transmitted by the polarized light separator 180 as linearly polarized light. The transmitted light is changed by the polarized light separator 160 to linearly polarized light in the direction parallel to the plane of the drawing, and is transmitted. The polarization direction is twisted 90° by the TN liquid crystal 140 to become linearly polarized light in the direction perpendicular to the plane of the drawing, and is absorbed by the polarizer 130. On the other hand, light in the direction parallel to the transmission axis 181 of the polarized light separator 180 in the light 125 is transmitted by the polarized light separator 180 as linearly polarized light. The transmitted light of the wavelength region $(-\Delta\lambda 1)$ is changed by the polarized light separator 160 to linearly polarized light in the direction perpendicular to the plane of the drawing, and is transmitted. The polarization direction is twisted 90° by the TN liquid crystal 140, and the light becomes linearly polarized light in the direction parallel to the plane of the drawing, is transmitted through the polarizer 130, and is reflected by the reflecting plate 195. The light reflected in this way passes through the polarizer 130, the TN liquid crystal 140, the polarized light separator 160, and the polarized light separator 180 again. In the middle of the passage, the light is diffused by the light-scattering layer 150, so that color of the wavelength region ($-\Delta\lambda 1$) can be viewed in a wide visual angle, and color display in the form of a paper rather than a form of the mirror surface can be obtained.

In the left-side voltage application section 110, light which is in the direction perpendicular to the transmission axis 181 of the polarized light separator 180 and of the wavelength region ($-\Delta\lambda 2$) in light 115 is transmitted by the polarized light separator 180 as linearly polarized light. The transmitted light is changed by the polarized light separator 160 to linearly polarized light in the direction parallel to the plane of the drawing, and is transmitted. The polarization direction is not changed by the TN liquid crystal 140, and the light becomes linearly polarized light in the direction perpendicular to the plane of the drawing, is transmitted through the polarizer 130, and is reflected by the reflecting plate 195. The light reflected in this way passes through the polarizer 130, the TN liquid crystal 140, the polarized light separator 160, and the polarized light separator 180 again. On the other hand, light in the direction parallel to the transmission axis 181 of the polarized light separator 180 in the light 115 is transmitted by the polarized light separator 180 as linearly polarized light. The transmitted light of the wavelength region ($-\Delta\lambda 1$) is changed by the polarized light separator 160 to linearly polarized light in the direction perpendicular to the plane of the drawing, and is transmitted. The polarization direction is not changed by the TN liquid crystal 140, and the light becomes linearly polarized light in the direction perpendicular to the plane of the drawing, and is absorbed by the polarizer 130. Thus, the light is diffused by the light-scattering layer 150 in the middle of the passage, the color of the wavelength region ($-\Delta\lambda 2$) can be viewed in a wide visual angle, and the two-color display in the form of paper rather than the form of a mirror surface can be obtained.

In this way, in the voltage non-application section 120, the color of the wavelength region ($-\Delta\lambda 1$) that is selectively transmitted through the polarized light separator 160 can be viewed, and in the voltage application section 110, the color of the wavelength region ($-\Delta\lambda 2$) that is selectively transmitted through the polarized light separator 180 can be viewed.

As a result of the foregoing, reflective two-color display of bright colors using the external light is effected by the principle of operation that is described with reference to FIG. 5.

Various embodiments of the display device operated on the basis of the principle as described above will be described as follows.

(First Embodiment)

Figure 6:
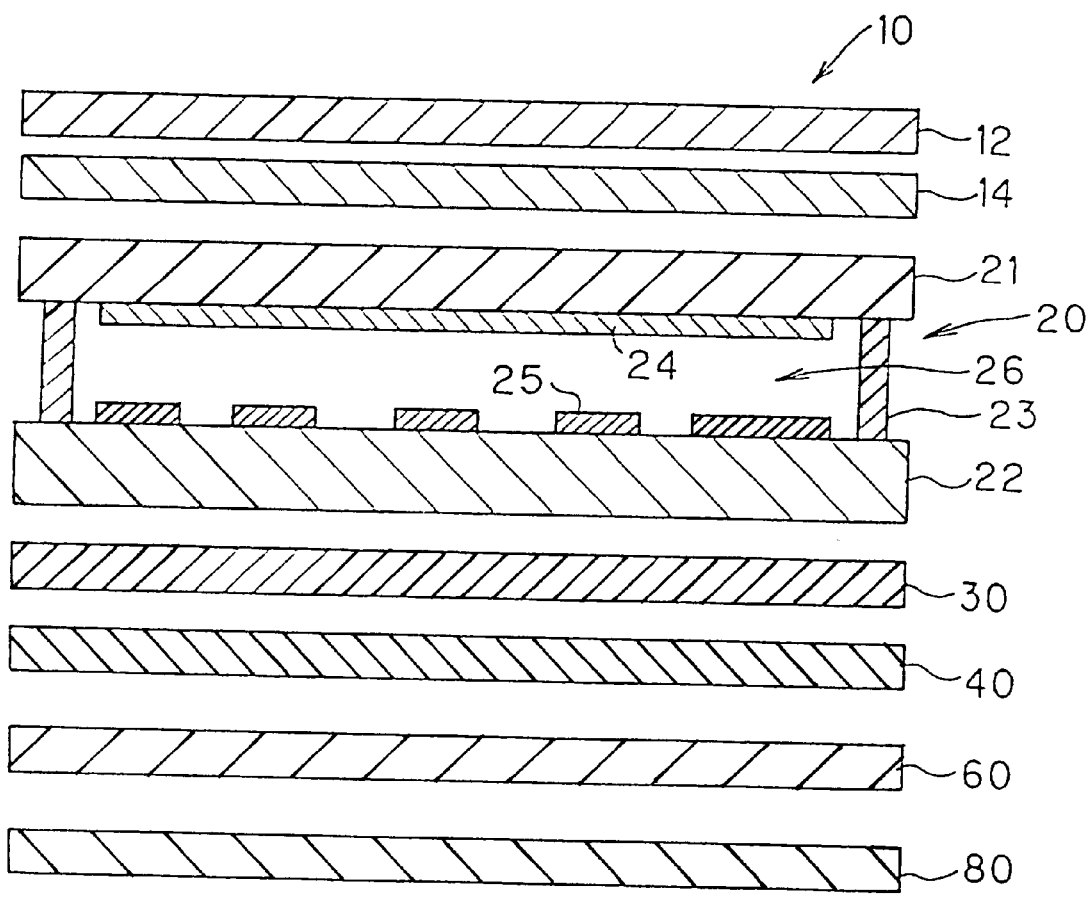
FIG. 6 is an exploded cross-sectional view for explaining a liquid crystal display device of a first embodiment of the present invention.

A description will be given of a liquid crystal display device of a first embodiment of the present invention with reference to FIG. 6. FIG. 6 is a exploded cross-sectional view for explaining a liquid crystal display device of the first embodiment of the present invention.

As shown in FIG. 6, in a liquid crystal display device 10 of the first embodiment, an STN cell 20 is used as an example of the variable transmission polarization axis optical element. A retardation film 14 and a polarizer 12 are provided in this order above the STN cell 20. A diffusing plate 30, a polarized light separator 40, a polarized light separator 60, and a light absorber 80 are provided in this order below the STN cell 20.

As the polarized light separators 40 and 60, the polarized light separators (that is, the reflective polarizers) described using FIG. 1 are used, respectively. However, the polarized light separator 40 is the polarized light separator for allowing the aforementioned expression (1) to be held only in a specific wavelength region ($\Delta\lambda 3$) of the visible light, transmitting linearly polarized light in the Y direction as the linearly polarized light in the Y direction, reflecting linearly polarized light of the wavelength ($\Delta\lambda 3$) in the X direction as the linearly polarized light in the X direction, and transmitting linearly polarized light of the other wavelength region ($-\Delta\lambda 3$) other than the wavelength region ($\Delta\lambda 3$) in the X direction as the linearly polarized light in the X direction. In addition, the polarized light separator 60 is the polarized light separator for allowing the aforementioned expression (1) to be held only in a specific wavelength region ($\Delta\lambda 4$) of the visible light, transmitting linearly polarized light in the Y direction as the linearly polarized light in the Y direction, reflecting linearly polarized light of the wavelength ($\Delta\lambda 4$) in the X direction as the linearly polarized light in the X direction, and transmitting linearly polarized light of the other wavelength region ($-\Delta\lambda 4$) other than the wavelength region ($\Delta\lambda 4$) in the X direction as the linearly polarized light in the X direction. The angle formed by the transmission axes of the polarized light separators 40 and 60 is 90°.

In the STN cell 20, an STN liquid crystal 26 is sealed in a cell formed by two sheets of glass substrates 21 and 22 and a sealing member 23. A transparent electrode 24 is provided on the lower surface of the glass substrate 21, and transparent electrodes 25 are provided on the upper surface of the glass substrate 22. As the transparent electrodes 24 and 25, ITO (Indium Tin Oxide) and stannic oxide can be employed. The retardation film 14 is employed as a color compensating optical anisotropic body, and is used to correct coloring caused in the STN cell 20. The light absorber 80 is a black film.

A description will be given of an operation of the liquid crystal display device 10 of this embodiment.

In a voltage non-application region, natural light is changed by the polarizer 12 to linearly polarized light in a predetermined direction and thereafter, is changed by the STN cell 20 to linearly polarized light of which the polarization direction is twisted by a predetermined angle, and light of the wavelength region ($\Delta\lambda 3$) is not absorbed but is reflected by the polarized light separator 40, the polarization direction thereof is twisted by a predetermined angle by the STN cell 20, and is emitted as linearly polarized light from the polarizer 12. In addition, the light of the wavelength region ($-\Delta\lambda 3$) is transmitted through the polarized light separator 40 and the polarized light separator 60, and is absorbed by the light absorber 80. In this way, when no voltage is applied, the light is not absorbed but is reflected by the polarized light separator 40, so that bright display color of the wavelength region ($\Delta\lambda 3$) can be obtained. Incidentally, since the diffusing plate 30 is provided between the STN cell 20 and the polarized light separator 40, the reflected light from the polarized light separator 40 is not shaped in the form of a mirror surface.

In a voltage application region, natural light is changed by the polarizer 12 to linearly polarized light in a predetermined direction and thereafter, is transmitted through the STN cell 20 and the diffusing plate 30 as linearly polarized light, and is also transmitted through the polarized light separator 40 as the linearly polarized light. Light of the wavelength region ($\Delta\lambda 4$) in the transmitted linearly polarized light is reflected by the polarized light separator 60, is transmitted through the polarized light separator 40, the diffusing plate 30, the STN cell 20 and the polarizer 12, and is emitted as linearly polarized light. In addition, light of the wavelength region (−Δλ4) is transmitted through the polarized light separator 60, and is absorbed by the light absorber 80. In this way, when a voltage is applied, the light is not absorbed but reflected by the polarized light separator 40 and the polarized light separator 60, so that bright display color of the wavelength region (Δλ4) can be obtained. Incidentally, since the diffusing plate 30 is provided between the STN cell 20 and the polarized light separator 40, the reflected light from the polarized light separator 40 is not shaped in the form of a mirror surface.

That is, according to the first embodiment, the display color of the wavelength region (Δλ3) and the display color of the wavelength region (Δλ4) can be switched, and two-color display using external light can be effected.

For example, there are a blue region as Δλ3 and a yellow region as Δλ4). In addition, for example, there are an orange region as Δλ3 and a green region as Δλ4.

(Second Embodiment)

A description will be given of a liquid crystal display device of a second embodiment of the present invention on the basis of the first embodiment.

According to the second embodiment, the angle formed by the transmission axes of the polarized light separator 40 and the polarized light separator 60 in the above first embodiment is taken as θ, and the angle θ was varied. Incidentally, in the above first embodiment, the angle θ is 90°. Other arrangements are the same as those of the first embodiment shown in FIG. 6.

According to the second embodiment, color contrast was improved as the angle θ increased to 0° to 90°. A practical level was obtained when the angle θ was 45°, the contrast was fairly improved when the angle θ became 60°, and further, when the angle θ became 90°, high-level color purity was obtained.

The contrast is improved as the angle θ is increased close to 90° because the closer the angle θ is increased to 90°, the higher the ratio of light in the light transmitted through the polarized light separator 40 to be reflected by the polarized light separator 60 is increased.

(Third Embodiment)

Figure 7:
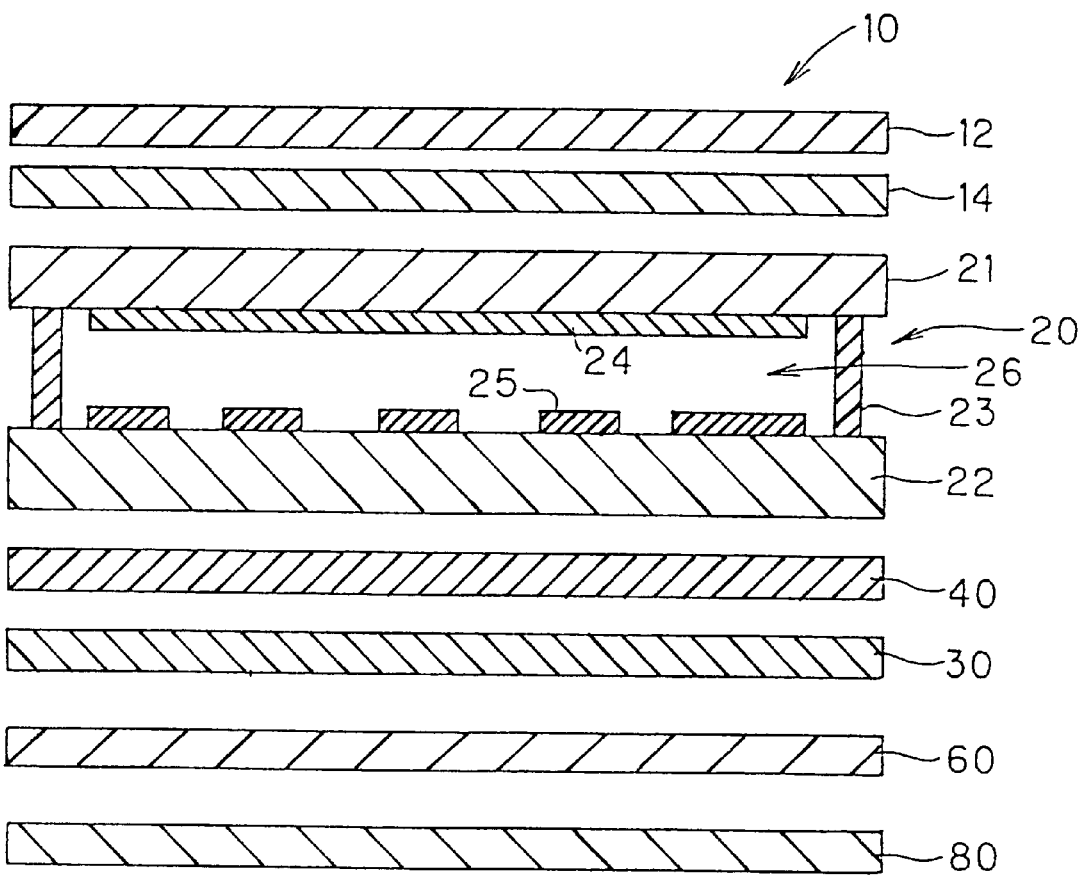
FIG. 7 is an exploded cross-sectional view for explaining a liquid crystal display device of a third embodiment of the present invention.

A description will be given of a liquid crystal display device of a third embodiment of the present invention with reference to FIG. 7. FIG. 7 is an exploded cross-sectional view for explaining the liquid crystal display device of the third embodiment of the present invention.

As shown in FIG. 7, in the third embodiment, the position of the diffusing plate 30 in the above first embodiment was changed to between the polarized light separator 40 and the polarized light separator 60. Other arrangements are the same as those of the first embodiment shown in FIG. 6. In addition, in the third embodiment, yellow was taken as the wavelength region (Δλ3) of the polarized light separator 40, and blue was taken as the wavelength region (Δλ4) of the polarized light separator 60. Thereupon, blue display (for example, background color) and yellow having a metallic shine, i.e., gold display (for example, display of letters or the like) could be switched.

(Fourth Embodiment)

Figure 8:
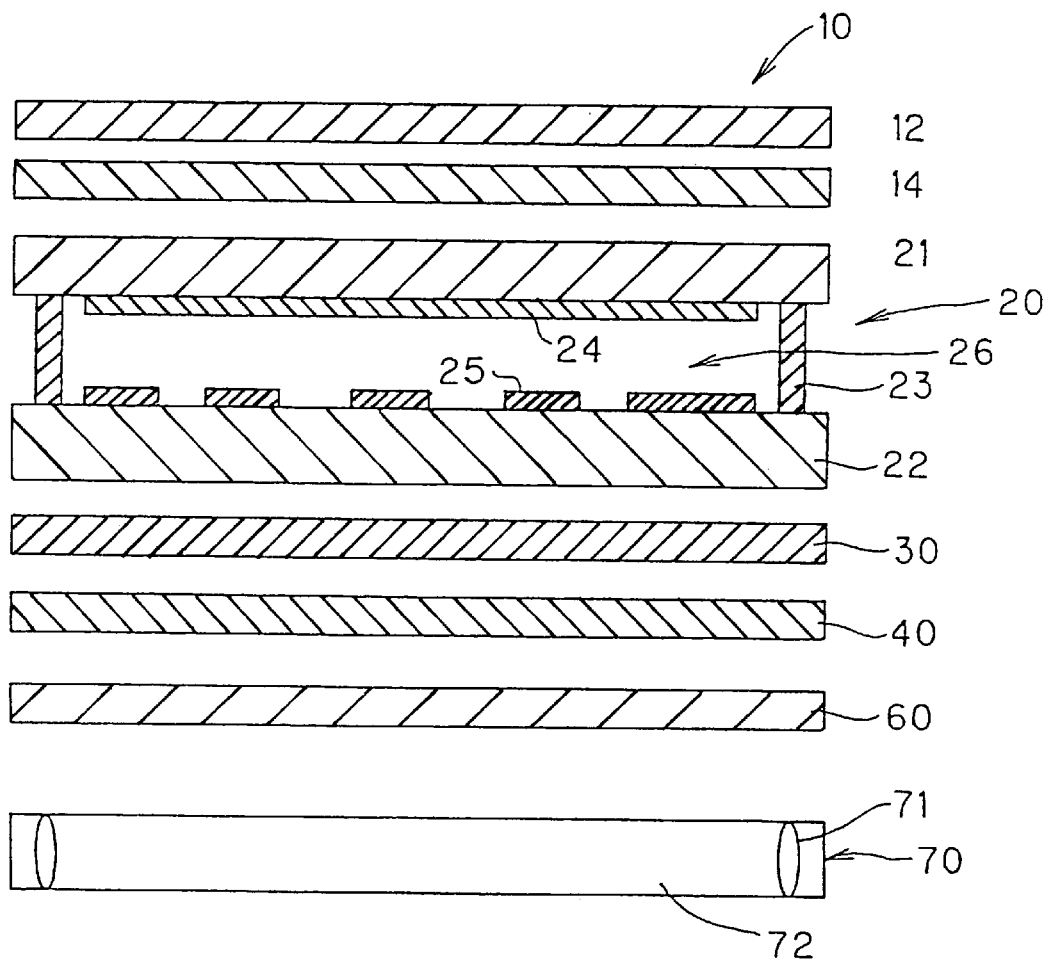
FIG. 8 is an exploded cross-sectional view for explaining a liquid crystal display device of a fourth embodiment of the present invention.

A description will be given of a liquid crystal display device of a fourth embodiment of the present invention with reference to FIG. 8. FIG. 8 is an exploded cross-sectional view for explaining the liquid crystal display device of the fourth embodiment of the present invention.

As shown in FIG. 8, in the fourth embodiment, a light source 70 was provided in place of the light absorber 80 in the above first embodiment. The light source 70 employs an LED (Light Emitting Diode) 71, and emits light upward by a light guide 72. Other arrangements are the same as those of the first embodiment shown in FIG. 6.

According to the fourth embodiment, under external light, similarly to the above first embodiment, the display color of the wavelength region (Δλ3) and the display color of the wavelength region (Δλ4) can be switched.

Under the illumination of the light source, the light incident on the polarized light separator 60 (from the lower side in FIG. 8) is transmitted through the polarized light separator 60 and the polarized light separator 40, whereby linearly polarized light of the wavelength region (−Δλ3) and linearly polarized light of the wavelength region (−Δλ4) can be obtained. They are perpendicular to each other. By switching the polarization states thereof by the STN liquid crystal 20, the display color of the wavelength region (−Δλ3) and the display color of the wavelength region (−Δλ4) can be switched. Incidentally, a detail about a transflective display device using the reflective polarizer is disclosed in Japanese Unexamined Patent Publication No. 8-245346.

According to the fourth embodiment, two-color display consisting of more vibrant blue display and gold display was obtained using the light source and external light.

(Fifth Embodiment)

A description will be given of a liquid crystal display device of a fifth embodiment of the present invention on the basis of the third embodiment.

In the fifth embodiment, the retardation film 14 in the above third embodiment was omitted. Other arrangements are the same as those of the third embodiment shown in FIG. 7.

According to the fifth embodiment, two-color display consisting of even more vibrant blue display and gold display was obtained using external light.

(Sixth Embodiment)

The display device of the first embodiment of the present invention was incorporated into a portable phone. Bright color display was obtained even in sunshine, in the shade, or in a room.

In addition, similar results were obtained even in the portable phone incorporating the display device of any one of the second to fifth embodiments of the present invention.

Furthermore, while the portable phone has been shown as an example in the embodiment of the present invention, the display device of the present invention can be employed in various types of electronic apparatuses, such as a household electrical apparatus, an electronic pocketbook, and an electronic calculator.

(Seventh Embodiment)

A description will be given of a liquid crystal display device of a seventh embodiment of the present invention on the basis of the first embodiment.

In the seventh embodiment, the polarized light separator 40 and the polarized light separator 60 in the first embodiment were combined by heating and pressurizing treatment. It was bonded to the STN cell 20. It made manufacturing fairly easier than bonding sequentially the polarized light separator 40 and the polarized light separator 60.

Figure 9A:
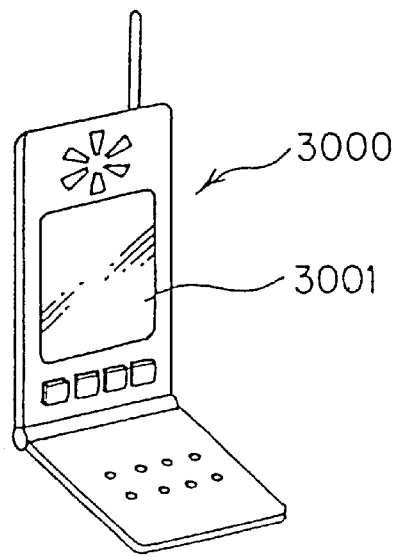
FIGS. 9(a), 9(b), and 9(c) are perspective views of embodiments of electronic apparatuses according to the present invention, respectively.
Figure 9B:
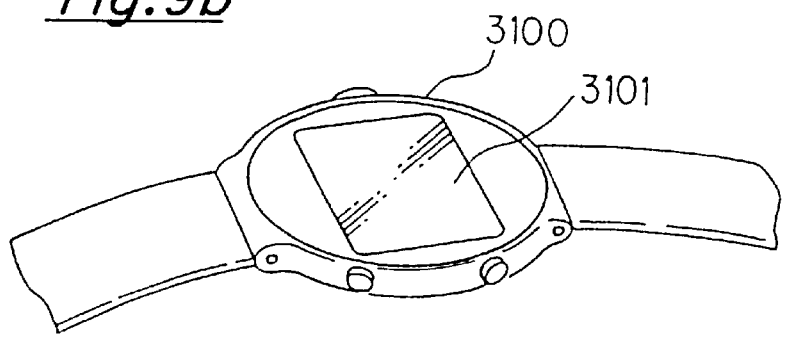
Figure 9C:
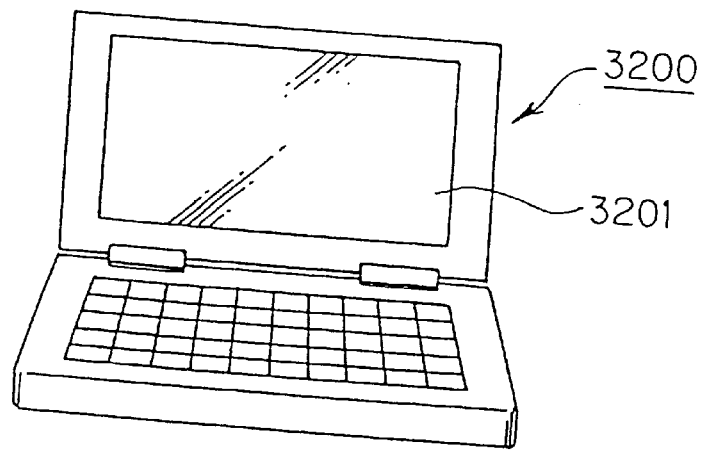

In addition, if the liquid crystal display device as described in the above respective embodiments is applied to, for example, a display section 3001 of a portable phone 3000 as shown in FIG. 9(a), an energy-saving-type portable phone for effecting bright reflective two-color display can be realized. If applied to a display section 3101 of a wristwatch 3100 as shown in FIG. 9(b), an energy-saving-type wristwatch for effecting bright reflective two-color display can be realized. In addition, if applied to a display screen 3201 of a personal computer 3200 as shown in FIG. 9(c), an energy-saving-type personal computer for effecting bright reflective two-color display can be realized.

In addition to the electronic apparatuses shown in FIG. 9, the liquid crystal display device of the present embodiment can be applied to the electronic apparatuses, such as a liquid crystal television, a viewfinder-type or a monitor-direct-view-type video tape recorder, a car navigation device, an electronic pocketbook, an electronic calculator, a word processor, an engineering workstation (EWS), a television phone, a POS terminal, and a device including a touch panel.

As described above in detail, according to the respective embodiments, two display states of a first display state and a second display state can be obtained in response to the state of the transmission polarization axis of the variable transmission polarization axis means. The display color of the first display state and the display color of the second display state are different from each other. In addition, both display states are the display states by the light reflected from the polarized light separating means, resulting in bright display. Incidentally, while display is effected by the light reflected from the polarized light separating means in the first to seven embodiments, display may be effected by the light transmitted through the polarized light separating means and reflected by the reflecting plate, as described with reference to FIG. 5.

INDUSTRIAL APPLICABILITY

The display device according to the present invention is available as a display device of easy-to-see two-color display which employs a liquid device as a variable transmission polarization axis means, and which uses external light, and further, is available as a display device which employs a variable transmission polarization axis means other than the liquid device. In addition, the electronic apparatus according to the present invention is constructed with the use of such display devices, and is available as an energy-saving-type electronic apparatus and the like which can effect high-quality two-color display using external light.

What is claimed is:

1. A display device, comprising:
    a variable transmission polarization axis means capable of varying a transmission polarization axis;
    a first polarized light separating means which is arranged on one side of said variable transmission polarization axis means, which transmits light of a linearly polarized light component in a first direction, and which reflects or absorbs light of a linearly polarized light component in a direction different from said first direction;
    a second polarized light separating means which is arranged on another side of said variable transmission polarization axis means, which transmits light of a linearly polarized light component in a second direction, and which reflects, of light of a linearly polarized light component in a predetermined direction different from said second direction, a component of a first wavelength region $\Delta\lambda 1$ and transmits a component of a wavelength region $-\Delta\lambda 1$ different from said first wavelength component; and
    a third polarized light separating means which is placed on a side opposite to said variable transmission polarization axis means with respect to said second polarized light separating means, which transmits light of a linearly polarized light component in a third direction, and which reflects, of light of a linearly polarized light component in a predetermined direction different from said third direction, a component of a second wavelength region $\Delta\lambda 2$ and transmits a component of a wavelength region $-\Delta\lambda 2$ different from said second wavelength component.

2. The display device as claimed in claim 1, wherein said variable transmission polarization axis means further comprises a liquid crystal device.

3. The display device as claimed in claim 2, wherein said liquid crystal further comprises a TN liquid crystal, an STN liquid crystal, or an ECB liquid crystal.

4. The display device as claimed in claim 1, wherein said first polarized light separating means further comprises a polarizer which transmits light of a linearly polarized light component in said first direction and which absorbs light of a linearly polarized light component in a direction perpendicular to said first direction.

5. The display device as claimed in claim 1, wherein said second polarized light separating means further comprises a reflective polarizer which transmits light of a linearly polarized light component in said second direction and which reflects light of a component of said first wavelength region $\Delta\lambda 1$ in a linearly polarized light component in the direction perpendicular to said second direction.

6. The display device as claimed in claim 5, wherein said reflective polarizer further comprises a laminated product in which a first layer having birefringence and a second layer having a refractive index that is substantially equal to any one of a plurality of refractive indexes of said first layer and having no birefringence are alternately laminated.

7. The display device as claimed in claim 1, wherein said third polarized light separating means further comprises a reflective polarizer which transmits light of a linearly polarized light component in said third direction and which reflects light of a component of said second wavelength region $\Delta\lambda 2$ in a linearly polarized light component in a direction perpendicular to said third direction.

8. The display device as claimed in claim 7, wherein said reflective polarizer further comprises a laminated product in which a first layer having birefringence and a second layer having a refractive index that is substantially equal to any one of a plurality of refractive indexes of said first layer and having no birefringence are alternately laminated.

9. The display device as claimed in claim 1, wherein an angle formed by said second direction and said third direction is 45° to 90°.

10. The display device as claimed in claim 1, wherein an angle formed by said second direction and said third direction is 60° to 90°.

11. The display device as claimed in claim 1, wherein an angle formed by said second direction and said third direction is 75° to 90°.

12. The display device as claimed in claim 1, further comprising a transmissive light-diffusing layer between said variable transmission polarization axis means and said second polarized light separating means.

13. The display device as claimed in claim 1, further comprising a transmissive light-diffusing layer between said second polarized light separating means and said third polarized light separating means.

14. The display device as claimed in claim 1, further comprising a light-absorbing means on a side opposite to said second polarized light separating means with respect to said third polarized light separating means.

15. The display device as claimed in claim 1, further comprising a light source for illuminating said variable transmission polarization axis means.

16. The display device as claimed in claim 1, further comprising a reflecting means on a side opposite to said variable transmission polarization axis means of said first polarized light separating means.

17. An electronic apparatus comprising a display device as claimed in claim 1.

18. A polarized light separator, comprising:

one polarized light separating means which transmits light of a linearly polarized light component in one direction, and which reflects, of light of a linearly polarized light component in a predetermined direction different from said one direction, a component of a first wavelength region $\Delta\lambda 1$ and which transmits a component of a wavelength region $-\Delta\lambda 1$ different from said first wavelength component; and another polarized light separating means which is located opposite to said one polarized light separating means, which transmits light of a linearly polarized light component in another direction, which reflects, of light of a linearly polarized light component in a predetermined direction different from another direction, a component of a second wavelength region $\Delta\lambda 2$ and which transmits a component of a wavelength region $-\Delta\lambda 2$ different from said second wavelength component.

19. A display device, comprising:

a variable transmission polarization axis optical element;

a first polarized light separator which is arranged on one side of said variable transmission polarization axis optical element, and which is of a type for effecting polarization separation by reflection or absorption;

a second polarized light separator which is placed on another side of said variable transmission polarization axis optical element, and which is of a type for effecting polarization separation by reflection for every wavelength of light; and a third polarized light separator which is arranged on a side opposite to said variable transmission polarization axis optical element with respect to said second polarized light separator, and which is of a type for effecting polarization separation by reflection for every wavelength of light.

20. A display device comprising:

a variable transmission polarization axis device;

a first polarized light separator disposed on a first side of said variable transmission polarization axis device;

a second polarized light separator disposed on a second side of said variable transmission polarization axis device; and a third polarized light separator disposed on a side of said second polarized light separator opposite said variable transmission polarization axis device;

wherein said first polarized light separator transmits a first linearly polarized light component and reflects or absorbs a second linearly polarized light component, said second polarized light separator transmits a third linearly polarized light component, reflects a fourth linearly polarized light component within a first wavelength region, and transmits said fourth lienarly polarized light component within a second wavelength region, and said third polarized light separator transmits a fifth linearly polarized light component, reflects a sixth linearly polarized light component within a third wavelength region, and transmits said sixth linearly polarized light component within a fourth wavelength region.

21. The display device of claim 20 further comprising a transmissive light diffuser disposed between said second polarized light separator and one of said variable transmissive polarization axis device and said third polarized light separator.

22. The display device of claim 20 further comprising a light absorber disposed on a side of said third polarized light separator opposite said second polarized light separator.

23. The display device of claim 20 further comprising a light source disposed proximate said variable transmission polarization axis device.

24. The display device of claim 20 further comprising a reflector disposed on a side of said first polarized light separator opposite said variable transmission polarization axis device.

* * * * *

UNITED STATES PATENT AND TRADEMARK OFFICE
CERTIFICATE OF CORRECTION

PATENT NO : 6,141,068

DATED : October 31, 2000

INVENTOR(S) : Chiyoaki Iijima

It is certified that error appears in the above-identified patent and that said Letters Patent are hereby corrected as shown below:

Column 2, line 23, insert --SUMMARY OF THE INVENTION--
Column 4, line 16, "forgoing" should be --foregoing--
Column 12, line 26, "polarized" should be --polarizer--
Column 13, line 31, "descried" should be --described--
Column 14, line 30, "show" should be --shown--
Column 17, line 20, "ΔΛ4)" should be --ΔΛ4--
Column 19, line 26, "seven" should be --seventh--
Column 22, line 20, "lienarly" should be --lineraly--

Signed and Sealed this

Fifteenth Day of May, 2001

NICHOLAS P. GODICI

*Attest:*

*Attesting Officer*   Acting Director of the United States Patent and Trademark Office